Patented July 18, 1939

2,166,122

UNITED STATES PATENT OFFICE 2,166,122

DUSTING COMPOSITION

Alfred M. Boyce, Riverside, Calif., dedicated by assignment to the Government and the People of the United States of America No Drawing. Application December 9, 1937, Serial No. 178,879

12 Claims. (Cl. 167—31)

This invention concerns dust compositions adapted to be employed for the control of insect and mite pests on trees and plants.

Dinitro-phenol compounds and their salts are toxic to a number of common insects. Low concentrations of these compounds may be applied to certain trees and plants under carefully controlled conditions for pest control, but by reason of the mechanical difficulties encountered in their application, their toxicity to humans, and their tendency to injure living vegetation when applied thereto at too high concentrations, they have not been widely used for insecticidal purposes. To overcome the above disadvantages, solutions of the nitro-phenols in petroleum oil have been employed, which compositions are capable of exerting a synergistic insecticidal effect upon a number of insect species when contacted therewith through the medium of oil-water emulsions. Such oily insecticidal products can be advantageously employed in certain phases of insect control on deciduous plants, but are not adapted to resolve problems of pest control on non-deciduous plants, and particularly such tropical and subtropical groups as citrus. While the use of insecticidal oil compositions on the latter provides commercial control for certain common pests, continued application of oil thereto has been found to seriously interfere with the normal development and life cycle of the plant, and to be accompanied by a depression of plant metabolism and other undesirable physiological disturbances.

I have discovered that, when relatively small amounts of dinitro-phenol compounds are intimately dispersed through or adsorbed on a carrier consisting essentially of finely divided redwood wood or bark, insecticidal compositions are obtained which are not subject to the disadvantages outlined above. These dust compositions can be safely applied to the foliage of both citrus and deciduous plant species, stick well to plant surfaces, and give a superior control of insect and mite pests without causing permanent injury to, or undesirable physiological disturbances in, the plant host. These compositions may be conveniently handled in conventional dusting apparatus to give uniform coverage of pest infested tree or plant surfaces.

The redwood wood carrier consists of finely divided pink colored fibers composed principally of cellulose and lignin and can be prepared by grinding or otherwise pulverizing redwood wood or sawdust. The corresponding redwood bark product is a finely divided dust consisting of transparent, red-brown flakes. These woody materials are substantially non-reactive with dinitro-phenolic compounds under the conditions of operation, are but slightly soluble in water, and tend to acidify and buffer water to a pH of between approximately 3 and 5. This acid buffering action reduces the water solubility of dinitro-phenol compounds dispersed in the redwood products, whereby the tendency of such phenols to be leached out of the composition on contact with dew or rain is reduced. This property of the mixture results in an increased residual toxicity not generally enjoyed by insecticidal and arachnidicidal dusting preparations. Finely divided redwood wood and bark alone have been found to have a definite repellent action to insects and mites, but are innocuous to both plants and humans. For use as carriers for dinitro-phenol compounds, these materials, hereinafter termed "redwood flour", preferably should have a particle size not in excess of 100 screen mesh, material of from 300 to 400 mesh having been found particularly satisfactory.

The dinitro-phenol compounds with which this invention is particularly concerned are those having the general formula:

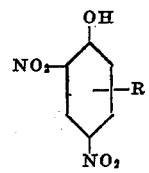

wherein R represents an alkyl or cycloalkyl radical containing at least 3 carbon atoms. While certain of the nitro compounds heretofore suggested as insecticides have been found to have a high toxicity to animals and humans and to be corrosive to living tissue, the compounds of the above class are relatively innocuous in the amounts employed, thereby substantially eliminating danger to operators during their handling and minimizing the problem of residue removal from fruit dusted therewith.

According to the invention, a small proportion of the dinitro-phenolic compound is intimately mixed with a redwood flour in any suitable manner to secure a thorough dispersion of the nitro compound with the carrier. For example, the phenol may be ground with the redwood flour to produce a product of suitable particle size. A further means for incorporating the phenolic derivative into the redwood flour consists in dissolving the phenol in a volatile organic solvent, moistening and mixing the carrier with the resultant solution, and subsequently evaporating the solvent from the mixture. The product obtained as above is adapted for insecticidal and arachnidicidal dusting without further treatment.

The proportion of dinitro-phenolic compound preferably incorporated with the redwood flour is generally between about 0.25 and 2.0 per cent by weight thereof, depending upon the particular insect or mite pest for which the composition is to be applied, the tolerance of the tree species for the dinitro compound employed, and the amount of the composition to be applied to the individual tree. For application to citrus trees, concentrations of from approximately 0.5 to 1.0 per cent by weight of nitro-phenol in the composition have been found to give satisfactory pest control and to be substantially non-injurious. The compositions may be further modified by the inclusion therein of various wetting, spreading, acidizing, and buffering agents, although the addition of an excess of alkaline material is not recommended lest the ability of the redwood flour carrier to acidify and buffer the composition to an acid pH be destroyed.

The following examples set forth certain modes in which my invention may be carried out and illustrate certain aspects thereof but are not to be construed as limiting the invention.

Example 1

One pound of 2,4-dinitro-6-cyclohexyl-phenol crystals was dissolved in 2000 milliliters of toluene, and 99 pounds of finely divided redwood bark flour of from 300 to 400 screen mesh particle size moistened therewith. This composition was thoroughly mixed and the toluene subsequently evaporated therefrom, leaving the 2,4-dinitro-6-cyclohexyl-phenol apparently adsorbed on the carrier. The resulting dust product did not tend to form agglomerates, and was found adapted for use in common dusting apparatus.

The above composition was dusted on orange trees of the Valencia variety in an amount equivalent to 2 pounds of the dust mixture per tree and effected a substantially complete kill of citrus red mites thereon. No burning or other injury directly attributable to the dust application was observed. Undusted control trees continued to show heavy red mite infestation and eventually showed serious foliage and fruit injury therefrom. A similar application was made to mite infested lemon trees of the Eureka variety with comparable results. The dust was found to have residual toxic action following application, adhered well to the bark, leaves and fruit of the trees, and was uniformly deposited on the tree surfaces.

Example 2

An insecticidal dusting composition of from 250 to 400 screen mesh particle size was prepared by grinding 1 pound of 2,4-dinitro-6-cyclohexyl-phenol with 99 pounds of redwood bark flour. This composition was dusted on Persian walnut trees at 3 pounds per tree for the control of common red spider. A substantially complete initial kill of both immature and adult spiders was thereby accomplished. The mites which hatched over a considerable period following the dusting operation were also controlled. Undusted controls continued to be heavily infested with the red spiders and suffered appreciable defoliation due to spider injury with resulting sunburn of the immature nuts. No injury attributable to the dust application was apparent.

Example 3

A composition was prepared substantially as described in Example 1 in which redwood wood flour of approximately 300 screen mesh particle size was employed as a carrier for 2,4-dinitro-6-cyclohexyl-phenol. This composition was dusted in the amount of 1 pound per tree upon Eureka lemon trees for the control of citrus thrips. Three days after dusting the treated plots were inspected and found substantially free of thrips infestation. No tree injury resulted from the dust application. Undusted control trees continued to be badly infested with thrips and sustained severe fruit scarring and defective foliage development directly attributable thereto.

In a similar manner, the dusting composition described in Example 1 was applied at the rate of 2 pounds per tree to portions of Valencia and Navel orange groves for the control of citrus thrips. Periodic inspection of the dusted trees showed that the dust accomplished a substantially complete initial kill and prevented thrips injury to the leaves and fruit for some period following application. The dusting of several trees with redwood bark flour alone did not accomplish a commercial control of the thrips infestation, and, while the insect population was reduced by the application, injury consisting of fruit scarring and defective foliage development was shown throughout the growing season.

Example 4

The mixtures described in the foregoing examples were tested on grapefruit to determine the residual toxicity of the dust deposit. The procedure consisted of precision dusting mature grapefruit of 4 inches diameter with 1 gram of the test compositions, weathering the dusted fruit for a period of time, and subsequently infesting each fruit with from 20 to 30 adult female citrus red mites. The infested fruit was then stored at a temperature of 80° F. and at a relative humidity of 60 per cent for from 1 to 5 days, and the mites thereon subsequently inspected through a low power microscope to determine the mortality attributable to the dust application. Compositions containing 1.0 per cent by weight of 2,4-dinitro-6-cyclohexyl-phenol in the redwood bark and wood flours, when tested as above, gave initial kills of 100 per cent of the mites, and after 12 days weathering were still toxic to an average of 96.6 per cent of the mites placed on the dusted fruit surface.

While the above examples concern compositions containing 2,4-dinitro-6-cyclohexyl-phenol, other compounds, such as 2,4-dinitro-6-isopropyl-phenol, 2,4-dinitro-6-normal-butyl-phenol, 2,4-dinitro-6-tertiary-butyl-phenol, 2,4-dinitro-5-secondary-amyl-phenol, 2,4-dinitro-6-cyclopentyl-phenol, 2,4-dinitro-5-cyclohexyl-phenol, 2,4-dinitro-6-normal-hexyl-phenol, 2,4-dinitro-6-normal-octyl-phenol, etc., may be substituted therefor. Mixtures of the above compounds with redwood wood or redwood bark flours may be applied to the foliage of walnut, apricot, fig, avocado, apple, peach, orange, lemon, and cherry trees, etc., for the control of such pests as Pacific mite, yellow mite, yellow striped army worm, bean thrips, flower thrips, black scale, citricola scale, orange tortrix, six-spotted mite, codling moth larvae, etc.

This application is a continuation-in-part of my prior and co-pending application Serial Number 177,737, filed December 2, 1937.

Other modes of applying the principle of my invention may be employed instead of those explained, change being made as regards the materials or amounts thereof employed, provided the products claimed in the following claims be thereby obtained.

I therefore particularly point out and distinctly claim as my invention:

1. An insecticidal composition adapted to be dusted on growing plants, consisting of an impalpable powder comprising a redwood flour of smaller particle size than 100 screen mesh, and carrying as an insecticidal toxicant intimately incorporated therewith a compound having the formula

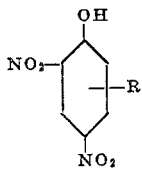

wherein R represents a hydrocarbon group containing at least 3 carbon atoms selected from the class consisting of the alkyl and cycloalkyl radicals.

2. An insecticidal dust comprising as a major constituent a redwood flour of smaller particle size than 100 screen mesh and a relatively small amount of an insecticidal toxicant intimately incorporated therewith, such toxicant being a compound having the formula

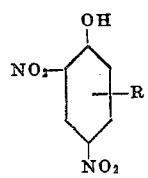

wherein R represents a hydrocarbon group containing at least 3 carbon atoms selected from the class consisting of the alkyl and cycloalkyl radicals.

3. An impalpable powder adapted to be dusted on growing plants for the control of insect and mite pests, said powder having a particle size smaller than 100 screen mesh and comprising as a major constituent a redwood flour and intimately incorporated therewith a compound having the formula

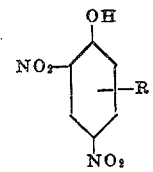

wherein R represents a hydrocarbon group containing at least 3 carbon atoms selected from the class consisting of the alkyl and cycloalkyl radicals.

4. An insecticidal dust comprising as a major constituent a redwood flour of smaller particle size than 100 screen mesh and a relatively small amount of an insecticidal toxicant intimately incorporated therewith, such toxicant being a compound having the formula

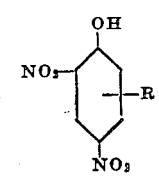

wherein R represents an alkyl group containing at least 3 carbon atoms.

5. An insecticidal dust comprising as a major constituent a redwood flour of smaller particle size than 100 screen mesh and a relatively small amount of an insecticidal toxicant intimately incorporated therewith, such toxicant being a compound having the formula

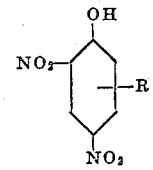

wherein R represents a cycloalkyl group.

6. An insecticidal dust comprising as a major constituent a redwood flour of smaller particle size than 100 screen mesh and a relatively small amount of 2,4-dinitro-6-cyclohexyl phenol intimately incorporated therewith.

7. An insecticidal composition adapted to be dusted on growing plants, consisting of an impalpable powder comprising redwood bark flour of smaller particle size than 100 screen mesh, and carrying as an insecticidal toxicant intimately incorporated therewith a compound having the formula

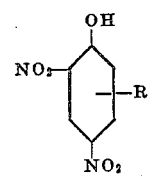

wherein R represents a hydrocarbon group containing at least 3 carbon atoms selected from the class consisting of the alkyl and cycloalkyl radicals.

8. An impalpable powder adapted to be dusted on growing plants for the control of insect and mite pests, said powder having a particle size smaller than 100 screen mesh and comprising as a major constituent redwood bark flour and intimately incorporated therewith a compound having the formula

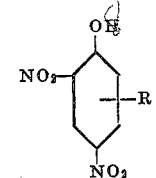

wherein R represents a hydrocarbon group containing at least 3 carbon atoms selected from the class consisting of the alkyl and cycloalkyl radicals.

9. An insecticidal dust comprising as a major constituent redwood bark flour of smaller particle size than 100 screen mesh and a relatively small amount of 2,4-dinitro-6-cyclohexyl phenol intimately incorporated therewith.

10. An insecticidal composition adapted to be dusted on growing plants, consisting of an impalpable powder comprising redwood wood flour of smaller particle size than 100 screen mesh, and carrying as an insecticidal toxicant intimately incorporated therewith a compound having the formula

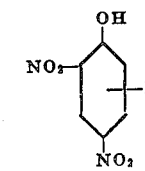

wherein R represents a hydrocarbon group containing at least 3 carbon atoms selected from the class consisting of the alkyl and cycloalkyl radicals.

11. An impalpable powder adapted to be dusted on growing plants for the control of insect and mite pests, said powder having a particle size smaller than 100 screen mesh and comprising as a major constituent redwood wood flour and intimately incorporated therewith a compound having the formula

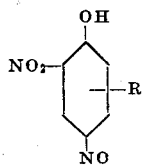

wherein R represents a hydrocarbon group containing at least 3 carbon atoms selected from the class consisting of the alkyl and cycloalkyl radicals.

12. An insecticidal dust comprising as a major constituent redwood wood flour of smaller particle size than 100 screen mesh and a relatively small amount of 2,4-dinitro-6-cyclohexyl phenol intimately incorporated therewith.

ALFRED M. BOYCE.